(12) United States Patent
Connor et al.

(10) Patent No.: US 12,033,206 B2
(45) Date of Patent: Jul. 9, 2024

(54) PRODUCT ORDER MANAGEMENT

(71) Applicant: DSRPTV, LLC, Dover, DE (US)

(72) Inventors: Eli Connor, West Jordan, UT (US); Josh Askeroth, Draper, UT (US)

(73) Assignee: DSRPTV, LLC, Dover, DE (US)

( * ) Notice: Subject to any disclaimer, the term of this patent is extended or adjusted under 35 U.S.C. 154(b) by 521 days.

(21) Appl. No.: 16/917,279

(22) Filed: Jun. 30, 2020

(65) Prior Publication Data

US 2021/0406989 A1    Dec. 30, 2021

(51) Int. Cl.
| | | |
|---|---|---|
| *G06Q 30/0601* | (2023.01) | |
| *G06F 8/61* | (2018.01) | |
| *G06F 16/955* | (2019.01) | |
| *G06F 21/10* | (2013.01) | |
| *G06Q 10/083* | (2023.01) | |
| *G06Q 10/0833* | (2023.01) | |
| *G06Q 20/12* | (2012.01) | |
| *G06Q 30/012* | (2023.01) | |
| *G06Q 30/016* | (2023.01) | |
| *G06Q 10/0834* | (2023.01) | |
| *G06Q 10/0835* | (2023.01) | |

(52) U.S. Cl.
CPC .......... *G06Q 30/0635* (2013.01); *G06F 8/61* (2013.01); *G06F 16/9558* (2019.01); *G06F 21/105* (2013.01); *G06Q 10/0833* (2013.01); *G06Q 10/0838* (2013.01); *G06Q 20/1235* (2013.01); *G06Q 20/127* (2013.01); *G06Q 30/012* (2013.01); *G06Q 30/016* (2013.01); G06F 21/101 (2023.08); *G06Q 10/0834* (2013.01); *G06Q 10/0835* (2013.01)

(58) Field of Classification Search
CPC .......... G06Q 30/0635; G06Q 10/0833; G06Q 10/0838; G06Q 20/1235; G06Q 20/127; G06Q 30/012; G06Q 30/016; G06Q 10/0834; G06Q 10/0835; G06F 16/9558; G06F 8/61; G06F 21/105; G06F 21/101
See application file for complete search history.

(56) References Cited

U.S. PATENT DOCUMENTS 7,130,818 B2 * 10/2006 Fisher ............ G06Q 10/063114
   705/40
7,525,429 B2    4/2009 Carrigan
(Continued)

FOREIGN PATENT DOCUMENTS

JP    2002183531    6/2002

OTHER PUBLICATIONS

Product News Network, "New myRMA Service Offers Extended Warranty Services for up to Five Years," Thomas Industrial Network, Inc., Jul. 23, 2019.*

*Primary Examiner* — Nathan Erb
(74) *Attorney, Agent, or Firm* — Kunzler Bean & Adamson (57) ABSTRACT

Apparatuses, methods, systems, and program products are disclosed for product order management. An apparatus includes a processor and a memory that stores code executable by the processor. The code is executable by the processor to receive an order for a product from a consumer. The order has a temporal element that begins upon delivery of the product. The code is executable by the processor to receive a notification that the product is delivered to the consumer. The code is executable by the processor to begin the temporal element of the order in response to receiving the delivery notification.

19 Claims, 5 Drawing Sheets

(56) References Cited

U.S. PATENT DOCUMENTS

| | | | |
|---|---|---|---|
| 7,698,276 | B2 | 4/2010 | Seshadri et al. |
| 7,895,298 | B1 * | 2/2011 | Murray ................ G06F 16/40 |
| | | | 709/224 |
| 8,015,023 | B1 | 9/2011 | Lee et al. |
| 9,619,540 | B2 | 4/2017 | Prathipati et al. |
| 9,883,389 | B2 * | 1/2018 | Frederick ............... H04L 51/04 |
| 10,148,530 | B2 | 12/2018 | Chatterjee et al. |
| 10,453,112 | B2 | 10/2019 | Alvo et al. |
| 10,475,041 | B2 | 11/2019 | Marum et al. |
| 2006/0026047 | A1 | 2/2006 | Jones |
| 2006/0253887 | A1 * | 11/2006 | Greene ............. H04N 21/6581 |
| | | | 725/100 |
| 2008/0027825 | A1 | 1/2008 | Boonie et al. |
| 2008/0162304 | A1 * | 7/2008 | Ourega ............. G06Q 30/0619 |
| | | | 705/26.4 |
| 2009/0055266 | A1 | 2/2009 | Brody et al. |
| 2009/0164333 | A1 * | 6/2009 | Rothman ............... G06Q 40/00 |
| | | | 705/26.1 |
| 2013/0066748 | A1 * | 3/2013 | Long ..................... G06Q 50/08 |
| | | | 705/27.1 |
| 2015/0039505 | A1 | 2/2015 | Jin et al. |
| 2015/0356279 | A1 * | 12/2015 | Montana ................ G06F 21/10 |
| | | | 726/28 |
| 2015/0363724 | A1 | 12/2015 | Chatterjee et al. |
| 2016/0034850 | A1 * | 2/2016 | Lehner ................ H04L 63/105 |
| | | | 705/340 |
| 2018/0177319 | A1 * | 6/2018 | Willis ................ G06Q 10/1097 |
| 2020/0387863 | A1 * | 12/2020 | Ruth .................. G06Q 10/0837 |
| 2021/0256472 | A1 * | 8/2021 | Javidan ............. G07C 9/00896 |

* cited by examiner

PRODUCT ORDER MANAGEMENT

FIELD

The subject matter disclosed herein relates to product orders and more particularly relates to managing trial periods for product orders.

BACKGROUND

Some companies sell products with a trial or evaluation period to give the consumer a chance to use the product before committing to purchase the product. The time period from which the trial or evaluation period begins, and the length of the trial or evaluation period may vary based on the product or the company selling the product.

BRIEF SUMMARY

Apparatuses, methods, systems, and program products are disclosed for product order management. An apparatus includes a processor and a memory that stores code executable by the processor. The code, in one embodiment, is executable by the processor to receive an order for a product from a consumer. The order may have a temporal element that begins upon delivery of the product. The code, in further embodiments, is executable by the processor to receive a notification that the product is delivered to the consumer. The code, in certain embodiments, is executable by the processor to begin the temporal element of the order in response to receiving the delivery notification.

A method for product order management, in one embodiment, includes receiving, by a processor, an order for a product from a consumer. The order may have a temporal element that begins upon delivery of the product. The method, in further embodiments, includes receiving a notification that the product is delivered to the consumer. In certain embodiments, the method includes beginning the temporal element of the order in response to receiving the delivery notification.

A computer program product for product order management, in one embodiment, includes a computer readable storage medium having program instructions embodied therewith. In certain embodiments, the program instructions are executable by a processor to cause the processor to receive an order for a product from a consumer. The order may have a temporal element that begins upon delivery of the product. In some embodiments, the program instructions are executable by a processor to cause the processor to receive a notification that the product is delivered to the consumer. In further embodiments, the program instructions are executable by a processor to cause the processor to begin the temporal element of the order in response to receiving the delivery notification.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. Scripting languages may also be used for carrying out operations for embodiments such as PHP, Perl, Python, VBScript, JavaScript, and/or the like. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus includes a processor and a memory that stores code executable by the processor. The code, in one embodiment, is executable by the processor to receive an order for a product from a consumer. The order may have a temporal element that begins upon delivery of the product. The code, in further embodiments, is executable by the processor to receive a notification that the product is delivered to the consumer. The code, in certain embodiments, is executable by the processor to begin the temporal element of the order in response to receiving the delivery notification.

In one embodiment, the temporal element comprises a trial period for the product. The trial period includes an evaluation period for the product. In certain embodiments, the trial period for the product begins in response to receiving the delivery notification indicating that the product is successfully delivered to the consumer.

In one embodiment, the temporal element comprises a subscription period for a product that the consumer subscribes to on a periodic basis. In certain embodiments, the subscription period for the product begins in response to receiving the delivery notification indicating that the product is successfully delivered to the consumer.

In one embodiment, the code is executable by the processor to log the order in a customer relationship management ("CRM") system in response to receiving the order. The temporal element for the order may include a field in the CRM for the order that is updated upon receiving the delivery notification for the product.

In further embodiments, the delivery notification is received from a shipping carrier system that is associated with shipment and delivery of the product. The CRM may be communicatively coupled to an application programming interface ("API") of the shipping carrier system to receive the delivery notification.

In certain embodiments, the code is executable by the processor to poll the shipping carrier system at periodic intervals to check a delivery status of the product for the order. In some embodiments, the code is executable by the processor to check a delivery status of the product from a different shipping carrier system in response to the shipping carrier system being unavailable.

In various embodiments, the code is executable by the processor to cancel the order in the CRM in response to the delivery notification indicating that delivery of the product is unsuccessful and send a notification to the consumer that the order is cancelled. In some embodiments, the code is executable by the processor to set a begin time for the temporal element of the order according to one of a time indicated in the delivery notification and a time determined based on when the delivery notification is received.

In one embodiment, the product comprises a digital product. The delivery notification may be received in response to the consumer clicking a link to download the digital product, installing the digital product on an electronic device, initially logging into an account for the consumer associated with the digital product, initially executing the digital product on an electronic device, and/or entering a license key for the digital product.

A method for product order management, in one embodiment, includes receiving, by a processor, an order for a product from a consumer. The order may have a temporal element that begins upon delivery of the product. The method, in further embodiments, includes receiving a notification that the product is delivered to the consumer. In certain embodiments, the method includes beginning the temporal element of the order in response to receiving the delivery notification.

In one embodiment, the temporal element comprises a trial period for the product. The trial period may include an evaluation period for the product that begins in response to receiving the delivery notification indicating that the product is successfully delivered to the consumer.

In certain embodiments, the temporal element comprises a subscription period for a product that the consumer subscribes to on a periodic basis. The subscription period for the product may begin in response to receiving the delivery notification indicating that the product is successfully delivered to the consumer.

In some embodiments, the method includes logging the order in a customer relationship management ("CRM") system in response to receiving the order. The temporal element for the order may include a field in the CRM for the order that is updated upon receiving the delivery notification for the product.

In various embodiments, the delivery notification is received from a shipping carrier system that is associated with delivery of the product. The CRM may be communicatively coupled to an application programming interface ("API") of the shipping carrier system to receive the delivery notification.

In one embodiment, the method includes checking a delivery status of the product from a different shipping carrier system in response to the shipping carrier system being unavailable. In some embodiments, the product comprises a digital product. The delivery notification may be received in response to the consumer clicking a link to download the digital product, installing the digital product on an electronic device, initially logging into an account for the consumer associated with the digital product, initially executing the digital product on an electronic device, and/or entering a license key for the digital product A computer program product for product order management, in one embodiment, includes a computer readable storage medium having program instructions embodied therewith. In certain embodiments, the program instructions are executable by a processor to cause the processor to receive an order for a product from a consumer. The order may have a temporal element that begins upon delivery of the product. In some embodiments, the program instructions are executable by a processor to cause the processor to receive a notification that the product is delivered to the consumer. In further embodiments, the program instructions are executable by a processor to cause the processor to begin the temporal element of the order in response to receiving the delivery notification.

Figure 1:
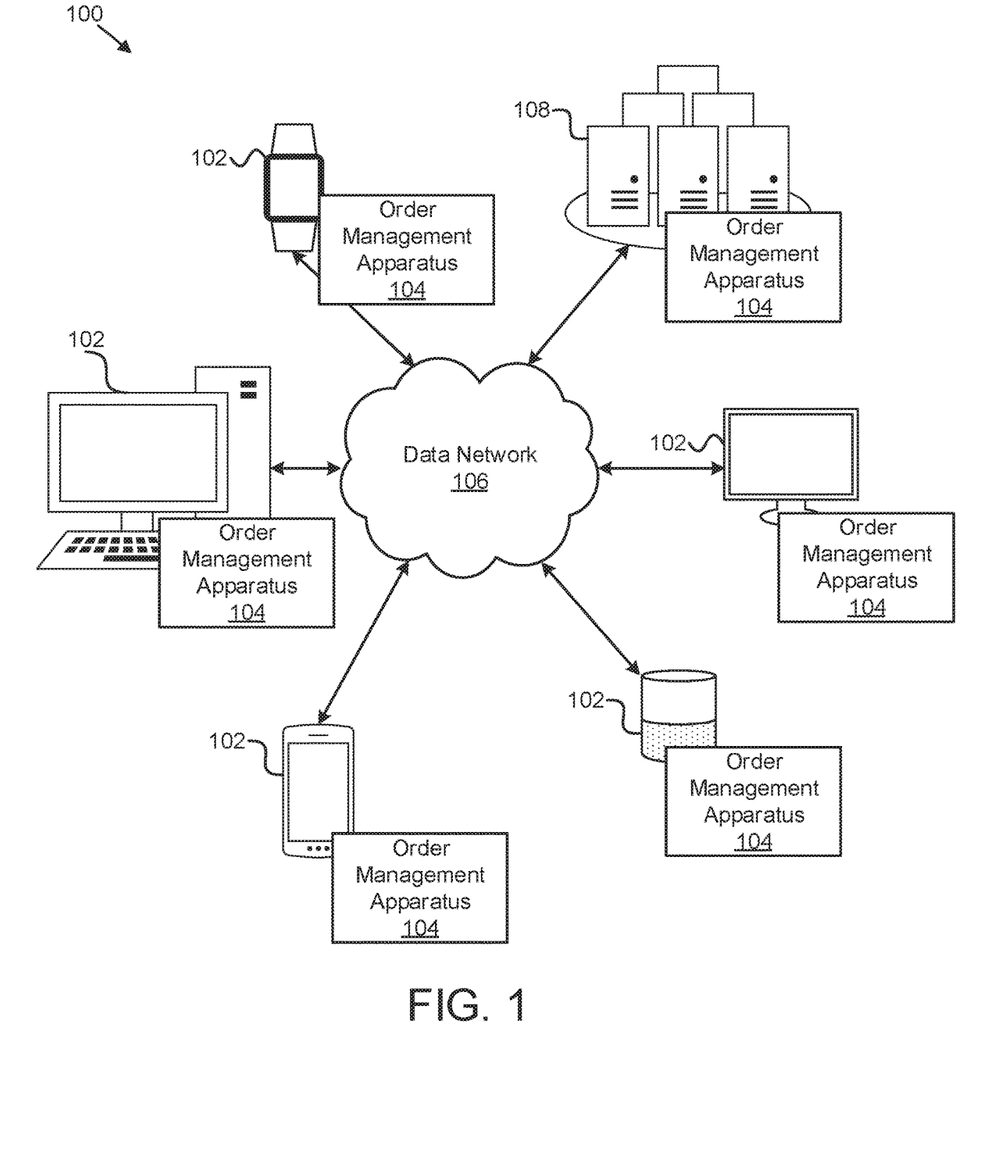
FIG. 1 is a schematic block diagram illustrating one embodiment of a system for product order management.

FIG. 1 is a schematic block diagram illustrating one embodiment of a system 100 for product order management. In one embodiment, the system 100 includes one or more information handling devices 102, one or more order management apparatuses 104, one or more data networks 106, and one or more servers 108. In certain embodiments, even though a specific number of information handling devices 102, order management apparatuses 104, data networks 106, and servers 108 are depicted in FIG. 1, one of skill in the art will recognize, in light of this disclosure, that any number of information handling devices 102, order management apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the order management apparatus 104 is configured to receive an order for a product from a consumer where the order has a temporal element that begins upon delivery of the product, receive a notification that the product is delivered to the consumer, and begin the temporal element of the order in response to receiving the delivery notification. The order management apparatus 104, including its various sub-modules, may be located on one or more information handling devices 102 in the system 100, one or more servers 108, one or more network devices, and/or the like. The order management apparatus 104 is described in more detail below with reference to FIGS. 2 and 3.

For instance, in conventional product order systems, a consumer may be provided with a trial period for evaluating a product that is ordered. The trial period may be a number of days, weeks, months, or the like. However, the trial period may begin prior to when the consumer actually receives the product, e.g., from the time that the product is ordered, the time that the product is shipped, or the like. Thus, the trial period for the product is not a true trial period but is usually some lesser period than advertised. Accordingly, the subject matter disclosed herein provides a system for accurately tracking, initiating, modifying, adjusting, and/or the like the trial period for a product from the time that the consumer actually receives the product.

In certain embodiments, the order management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the order management apparatus 104 may include a power interface, a wired and/or wireless network interface, a graphical interface that attaches to a display, and/or a semiconductor integrated circuit device as described below, configured to perform the functions described herein with regard to the order management apparatus 104.

The order management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like.

In one embodiment, the order management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the order management apparatus 104.

The semiconductor integrated circuit device or other hardware appliance of the order management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the order management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like.

The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

Figure 2:
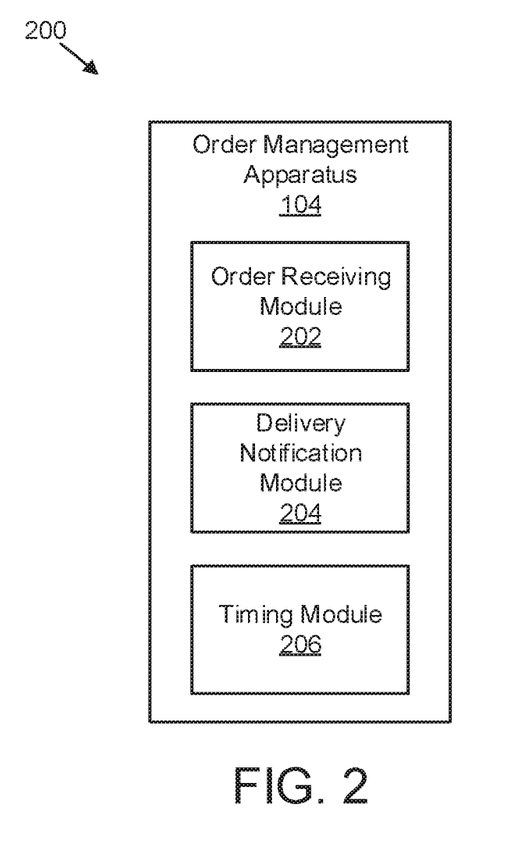
FIG. 2 is a schematic block diagram illustrating one embodiment of an apparatus for product order management.

FIG. 2 is a schematic block diagram illustrating one embodiment of an apparatus 200 for product order management. In one embodiment, the apparatus 200 includes an instance of an order management apparatus 104. In one embodiment, the order management apparatus 104 includes one or more of an order receiving module 202, a delivery notification module 204, and a timing module 206, which are described in more detail below.

In one embodiment, the order receiving module 202 is configured to receive an order for a product from a consumer. In certain embodiments, the order is received via an online ordering system such as an ecommerce site, e.g., Amazon®, or other online store. In one embodiment, the order is received from a customer service system where the order is entered manually by a user who takes an order over the phone, through the mail, by fax, and/or the like.

The product, as described herein, may be a physical or tangible product that is shipped and delivered to the user by a shipping carrier, e.g., UPS®, FedEx®, or the like. In some embodiments, the product may be a virtual or digital product such as a software program, application, and/or the like, which may be downloaded from a webserver, file server, or the like; installed using a storage device such as a CD-ROM, DVD, flash drive, and/or the like; transferred from one device to another using a short range wireless communication method such as NFC, Bluetooth®, and/or the like.

Regardless the product type, the product order may include a temporal element such as an evaluation period, a trial period, a subscription period, a warranty period, a guarantee period, and/or the like. In such an embodiment, the temporal element may begin when the product is delivered to the consumer, as described in more detail below. For example, for a tangible product, the evaluation period may begin when the shipping carrier flags the product as delivered to the consumer's home or office. In another example, for a digital product, a trial period may begin when the consumer downloads or installs the digital product on a computing device.

In certain embodiments, a manufacturer or retailer may provide a warranty or guarantee with a product. A warranty or guarantee, as used herein, may refer to a guarantee (e.g., a written guarantee or assurance), issued to the purchaser of a product by its manufacturer or seller, promising to repair or replace the product if necessary within a specified period of time, e.g., the warranty or guarantee period. The warranty or guarantee period may be on the manner of days, weeks, months, or even years depending on the product and the manufacturer/seller terms.

In one embodiment, the delivery notification module 204 is configured to receive a notification that the product is delivered to the consumer. In one embodiment, for a tangible product, the delivery notification module 204 receives a delivery notification from a shipping carrier, e.g., FedEx®, UPS®, or the like. The delivery notification module 204 may interface with a delivery status system for the shipping carrier, e.g., via an application programming interface ("API"), a web server, a screen scrape, and/or the like, to receive notifications, alerts, flags, and/or the like that indicate a shipping or delivery status of the product. The delivery notification may be notification message, flag, or the like that confirms that the product has been delivered to the consumer.

In the case of a digital or virtual product, the delivery notification module 204 may receive a message, notification, signal, flag, or the like when the consumer clicks a link to download the digital product (e.g., from a website, file sharing site, or the like), installs the digital product on a computing device (e.g., as a mobile app on a mobile device, as a program on a laptop/desktop, or the like), initially logs into the product or a user account for the consumer associated with the digital product (e.g., for a software-as-a-service ("SAAS") product, or the like), initially executes the digital product on a computing device (e.g., initially runs a mobile application or program, or the like), enters a license key for the digital product (e.g., for a desktop/laptop application, for a SAAS product, or the like), and/or the like.

For instance, the delivery notification module 204 may receive a notification from a license manager when the user enters a valid license key (e.g., a trial key) for authorizing use of a software product. Similarly, the delivery notification module 204 may receive a notification when the user clicks a link to download an application and/or when an application is successfully installed on a device.

In one embodiment, the notification that the delivery notification module 204 receives includes a timestamp, e.g., a date and/or time that indicates when the product was delivered to the consumer. The timestamp may include a day, a time specified to the hour, minute, second, and/or the like for when the product was delivered.

In one embodiment, the timing module 206 is configured to begin the temporal element of the order in response to receiving the delivery notification. For instance, the timing module 206 may be configured to set the start date/time of a trial period or an evaluation period for the product when the delivery notification is received—indicating that the product is successfully delivered to the consumer. In another example embodiment, the timing module 206 may begin a warranty or guarantee period/term for the product when the delivery notification is received and indicates that the product was delivered successfully.

The timing module 206 may set the start date/time for the trial period or the evaluation period from a point when the delivery notification is received, from a date/time included in the delivery notification, e.g., the date/time that the product was delivered, and/or the like. From the set start date/time, the trial or evaluation period runs and may be managed, tracked, maintained, or the like in a customer relationship management ("CRM") system or other product or consumer management system.

In certain embodiments, the temporal element is for a subscription period for a product that the consumer subscribes to on a periodic basis. For instance, a consumer may subscribe to receive a particular product every day, every other day, every week, every two weeks, every month, every three months, every six months, every year, and/or the like. In such an embodiment, the timing module 206 begins the subscription period for the product in response to receiving the delivery notification—indicating that the product is successfully delivered to the consumer.

The timing module 206 may set the start date/time for the subscription period from a point when the delivery notification is received, from a date/time included in the delivery notification, e.g., the date/time that the product was delivered, and/or the like. From the set start date/time, the subscription period runs and may be managed, tracked, maintained, or the like in a customer relationship management ("CRM") system or other product or consumer management system.

In certain embodiments, the timing module 206 may note the trial, evaluation, warranty, or subscription period when the product is ordered, e.g., a seven-day trial, and start the trial, evaluation, or subscription period in response to the product being ordered. Accordingly, when the delivery notification module 204 receives the delivery notification, the timing module 206 may adjust the trial period based on the date/time when the delivery notification is received, based on a date/time specified in the delivery notification, and/or the like. For instance, the timing module 206 may start a seven-day trial for a product when the product is ordered, and then adjust the trial period by three days in response to the date/time when the delivery notification is received and/or the date/time specified in the delivery notification being three days after the trial period begins.

In this manner, the order management apparatus 104, in one embodiment, tracks an accurate trial, evaluation, or subscription period for a product based on when the product is delivered to the user instead of being based on when the product was ordered or at another point in time prior to when the consumer actually receives the product. This ensures that the consumer is provided with a full and accurate trial, evaluation, or subscription period for a product.

Figure 3:
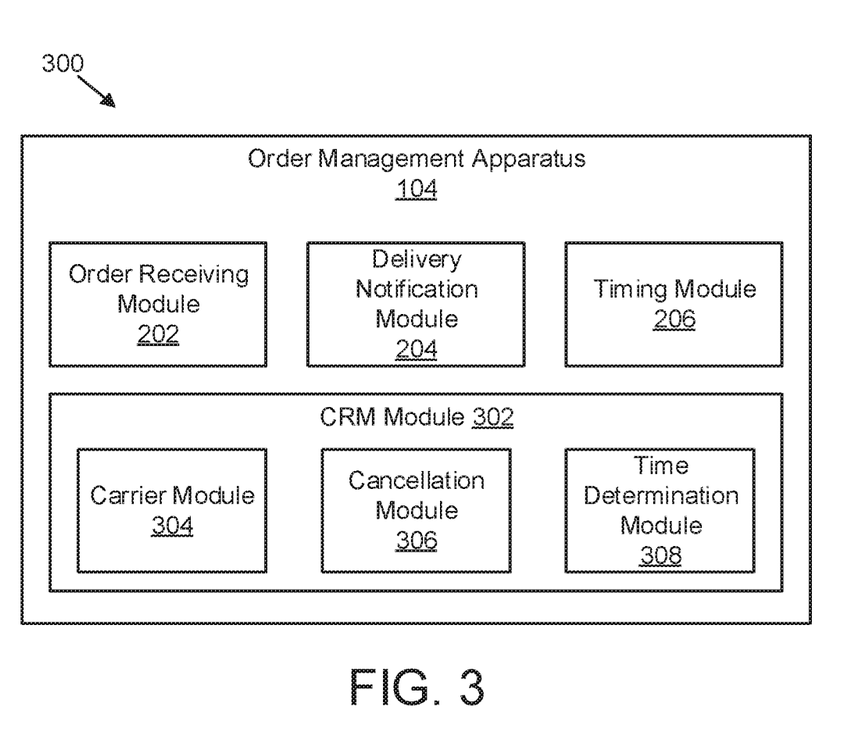
FIG. 3 is a schematic block diagram illustrating one embodiment of another apparatus for product order management.

FIG. 3 is a schematic block diagram illustrating one embodiment of another apparatus 300 for product order management. In one embodiment, the apparatus 300 includes an instance of an order management apparatus 104. The order management apparatus 104, in certain embodiments, includes an order receiving module 202, a delivery notification module 204, and a timing module 206, which may be substantially similar to the order receiving module 202, the delivery notification module 204, and the timing module 206 described above with reference to FIG. 2. The order management apparatus 104, in further embodiments, includes a CRM module 302 that includes one or more of a carrier module 304, a cancellation module 306, and a time determination module 304, which are described in more detail below.

In one embodiment, the CRM module 302 is configured to log the order for the product in a customer relationship management ("CRM") system (or other customer/product/order management system) in response to receiving the product order. As part of logging the order in the CRM, the CRM module 302 may enter a temporal element for the order in a field in the CRM for the product order in response to the product including a trial, evaluation, or subscription period.

In one embodiment, the CRM module 302 enters the date/time for the temporal period as the date/time when the product was ordered, and then adjusts the temporal period when the delivery notification module 204 receives the delivery notification. For example, the CRM module 302 may start the trial period for a 14-day trial in the CRM and then adjust the trial period (e.g., add days, hours, minutes, or the like) based on the time that the delivery notification is received or based on the time that the product was delivered as specified in the delivery notification.

In one embodiment, the CRM module 302 sets the temporal element in the CRM to NULL, 0, NIL, or another nonsense value when the product is ordered and then updates the temporal element with the trial, evaluation, warranty, or subscription period in response to receiving the delivery notification. In this manner, the CRM module 302 does not make an adjustment to an originally entered time, but instead enters the trial, evaluation, warranty, or subscription period based on the date/time that the delivery notification is received and/or the date/time that is specified in the delivery notification.

In one embodiment, the CRM module 302 includes a carrier module 304 that is configured to interface with a shipping carrier system to facilitate receiving the delivery notification that is associated with shipment and delivery of the product. As used herein, a shipping carrier may refer to a person or company that transports and delivers tangible products, e.g., FedEx®, UPS®, USPS®, and/or the like.

The carrier module 304 may interface with a shipping carrier's system, e.g., a shipping and delivery notification, tracking, and/or alert system to receive delivery notifications. For instance, the carrier module 304 may provide a tracking number to the shipping carrier's system to check the delivery status of the product. In certain embodiments, the carrier module 304 may enter and submit the tracking number in a web page for the shipping carrier and then scrape the resulting webpage for data, e.g., text, that indicates a delivery status of the product. The interface may include an API, a command line interface, a web interface, a screen scrape of a webpage, and/or the like.

In one embodiment, the carrier module 304 polls the shipping carrier system at periodic intervals to check a delivery status of the product for the order. For example, the carrier module 304 may send a request for a delivery status using an API into a UPS system every minute, every ten minutes, every half hour, every hour, once a day, or the like. The closer the intervals, the more accurate the timing for the trial, evaluation, warranty, or subscription period for the product; however, some carriers may charge a fee to interface with their systems. Thus, the carrier module 304 may determine an optimal interval for querying the carrier system based on the fees required to access the system.

In one embodiment, if the shipping carrier system is down, unavailable or the like, the carrier module 304 checks a delivery status of the product using a different shipping carrier system, a different shipping delivery status system, or the like. For example, the carrier module 304 may query a different or general shipping system interface, e.g., Shippo®, to determine the status of the product delivery.

In one embodiment, the CRM module 302 includes an instance of a cancellation module 306 that is configured to cancel the order in the CRM in response to the delivery notification indicating that delivery of the product is unsuccessful and send a notification to the consumer that the order is cancelled, e.g., via electronic message such as a text message, an email message, an instant message, a social media message, and/or the like.

In such an embodiment, the CRM module 302 does not start, track, manage, update, adjust, or the like the temporal element for the product in the CRM if a delivery notification is not received for the product, if a delivery notification indicates that the product delivery failed, or the like. In this manner, the consumer does not lose their trial, warranty, or evaluation period for a product that the consumer orders but does not receive.

In one embodiment, the CRM module 302 includes an instance of a time determination module 308 that is configured to set a begin time for the temporal element of the order according to one of a time indicated in the delivery notification and a time determined based on when the delivery notification is received. As described above, the time determination module 308 may select the begin time for the trial, evaluation, warranty, or subscription period (e.g., based on the delivery date/time in the delivery notification or the date/time that the delivery notification is received) and may calculate, adjust, modify, set, or the like the trial, evaluation, warranty, or subscription period for the product.

In certain embodiments, the order management apparatus 104 may be embodied as a plugin, add-in, extension, or the like of a CRM system that can be integrated into various different CRM systems to provide more accurate trial, evaluation, warranty, and/or subscription time period management, as described in detail herein.

Figure 4:
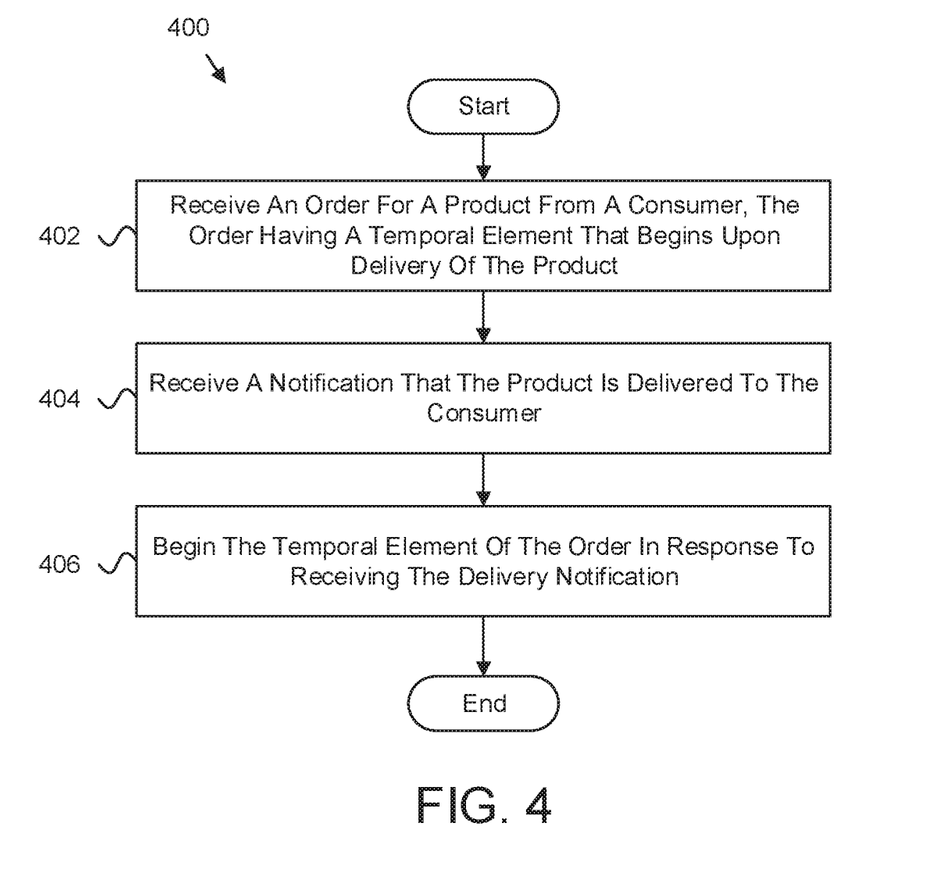
FIG. 4 is a schematic flow chart diagram illustrating one embodiment of a method for product order management.

FIG. 4 is a schematic flow chart diagram illustrating one embodiment of a method 400 for product order management. In one embodiment, the method 400 begins and receives 402 an order for a product from a consumer. The order may have a temporal element that begins upon delivery of the product. In further embodiments, the method 400 receives 404 a notification that the product is delivered to the consumer.

In some embodiments, the method 400 begins 406 the temporal element of the order in response to receiving the delivery notification, and the method 400 ends. In one embodiment, the order receiving module 202, the delivery notification module 204, and the timing module 206 perform the various steps of the method 400.

Figure 5:
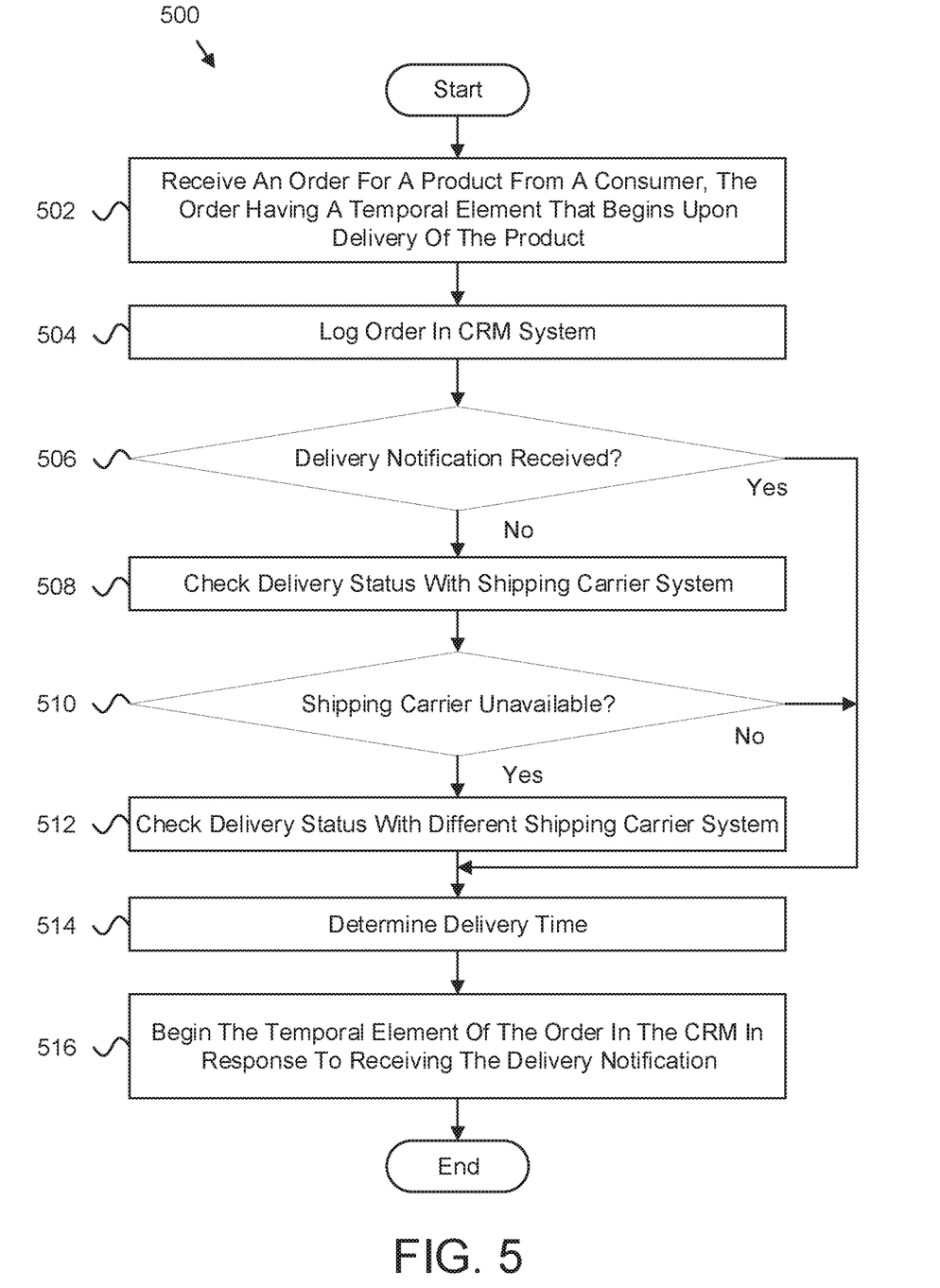
FIG. 5 is a schematic flow chart diagram illustrating one embodiment of another method for product order management.

FIG. 5 is a schematic flow chart diagram illustrating one embodiment of another method 500 for product order management. In one embodiment, the method 500 begins and receives 502 an order for a product from a consumer. The order may have a temporal element that begins upon delivery of the product.

In certain embodiments, the method 500 logs 504 the order in a CRM system. The method 500 determines 506 whether a delivery notification for the product is received. If not, in one embodiment, the method 500 checks 508 a delivery status of the product with a delivery notification system for a shipping carrier that shipped the product, e.g., UPS®.

The method 500, in one embodiment, determines 510 whether the shipping carrier system is unavailable. If so, the method 500, in one embodiment, checks 512 a delivery status of the product order with a different shipping carrier system that has access to delivery information for the product.

Otherwise, in one embodiment, the method 500 determines 514 a delivery date/time for the product, based on the received delivery notification, and begins 516 the temporal element of the order in response to receiving the delivery notification, and the method 500 ends. In one embodiment, the order receiving module 202, the delivery notification module 204, the timing module 206, the CRM module 302, the carrier module 304, and the time determination module 308 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
 a processor of a seller of a product, wherein delivery of the product is carried out by a product carrier; and
 a memory that stores code executable by the processor to:
  receive, at the processor, an order for the product from a consumer, the order having a temporal element that begins upon delivery of the product;
  receive a tracking number for the product from the product carrier;
  enter the tracking number for the product into a webpage;
  receive a delivery notification by scraping a resulting webpage, of a computing system of the product carrier, for data indicating a delivery status of the product, the delivery status indicating successful delivery of the product; and
  automatically store, in the memory, a begin time for the temporal element of the order in response to receiving the delivery notification, wherein the begin time is based on at least one of:
   a date and a time within the date indicated in the delivery notification; and
   a date and a time within the date determined based at least in part on when the delivery notification is received.

2. The apparatus of claim 1, wherein the temporal element comprises a trial period for the product, the trial period comprising an evaluation period for the product.

3. The apparatus of claim 2, wherein the trial period for the product begins in response to receiving the delivery notification indicating that the product is successfully delivered to the consumer.

4. The apparatus of claim 1, wherein the temporal element comprises a subscription period for a product that the consumer subscribes to on a periodic basis.

5. The apparatus of claim 4, wherein the subscription period for the product begins in response to receiving the delivery notification indicating that the product is successfully delivered to the consumer.

6. The apparatus of claim 1, wherein the code is executable by the processor to log the order in a customer relationship management ("CRM") system in response to receiving the order, the temporal element for the order comprising a field in the CRM for the order that is updated upon receiving the delivery notification for the product.

7. The apparatus of claim 1, wherein the code is executable by the processor to poll the computing system of the product carrier at periodic intervals to check a delivery status of the product for the order.

8. A method, comprising:
 receiving, by a processor of a seller of a product, an order for the product from a consumer, wherein delivery of the product is carried out by a product carrier, the order having a temporal element that begins upon delivery of the product;
 receiving a tracking number for the product from the product carrier;

entering the tracking number for the product into a webpage;

receiving a delivery notification by scraping a resulting webpage, of a computing system of the product carrier, for data indicating a delivery status of the product, the delivery status indicating successful delivery of the product; and automatically storing in memory, a begin time for the temporal element of the order in response to receiving the delivery notification, wherein the begin time is based on at least one of:

a date and a time within the date indicated in the delivery notification; and a date and a time within the date determined based at least in part on when the delivery notification is received.

9. The method of claim 8, wherein the temporal element comprises a trial period for the product, the trial period comprising an evaluation period for the product that begins in response to receiving the delivery notification indicating that the product is successfully delivered to the consumer.

10. The method of claim 8, wherein the temporal element comprises a subscription period for a product that the consumer subscribes to on a periodic basis, the subscription period for the product beginning in response to receiving the delivery notification indicating that the product is successfully delivered to the consumer.

11. The method of claim 8, further comprising logging the order in a customer relationship management ("CRM") system in response to receiving the order, the temporal element for the order comprising a field in the CRM for the order that is updated upon receiving the delivery notification for the product.

12. The method of claim 8, further comprising polling the computing system of the product carrier at periodic intervals to check a delivery status of the product for the order.

13. A computer program product, comprising a non-transitory computer readable storage medium having program instructions embodied therewith, the program instructions executable by a processor to cause the processor to:

receive an order for a product from a consumer, wherein delivery of the product is carried out by a product carrier, the order having a temporal element that begins upon delivery of the product;

receive a tracking number for the product from the product carrier;

enter the tracking number for the product into a webpage;

receive a delivery notification by scraping a resulting webpage, of a computing system of the product carrier, for data indicating a delivery status of the product, the delivery status indicating successful delivery of the product; and automatically store, in memory, a begin time of the temporal element of the order in response to receiving the delivery notification, wherein the begin time is based on at least one of:

a date and a time within the date indicated in the delivery notification; and a date and a time within the date determined based at least in part on when the delivery notification is received.

14. The computer program product of claim 13, wherein the temporal element comprises a trial period for the product, the trial period comprising an evaluation period for the product.

15. The computer program product of claim 14, wherein the trial period for the product begins in response to receiving the delivery notification indicating that the product is successfully delivered to the consumer.

16. The computer program product of claim 13, wherein the temporal element comprises a subscription period for a product that the consumer subscribes to on a periodic basis.

17. The computer program product of claim 16, wherein the subscription period for the product begins in response to receiving the delivery notification indicating that the product is successfully delivered to the consumer.

18. The computer program product of claim 13, wherein the program instructions are executable by the processor to cause the processor to log the order in a customer relationship management ("CRM") system in response to receiving the order, the temporal element for the order comprising a field in the CRM for the order that is updated upon receiving the delivery notification for the product.

19. The computer program product of claim 13, wherein the program instructions are executable by the processor to cause the processor to poll the computing system of the product carrier at periodic intervals to check a delivery status of the product for the order.

* * * * *